United States Patent
Knotts et al.

(10) Patent No.: US 6,876,114 B2
(45) Date of Patent: Apr. 5, 2005

(54) APPARATUS FOR REDUCING SPINDLE MOTOR MAGNETIC DRAG

(75) Inventors: Ralph James Knotts, Eden Prairie, MN (US); Garry Edward Korbel, New Prague, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/896,367

(22) Filed: Jun. 28, 2001

(65) Prior Publication Data

US 2002/0070616 A1 Jun. 13, 2002

Related U.S. Application Data

(60) Provisional application No. 60/255,264, filed on Dec. 13, 2000.

(51) Int. Cl.[7] .............................. H02K 1/00; G11B 17/02
(52) U.S. Cl. .............................. 310/156.26; 310/156.01; 310/85; 310/156.08; 360/99.08
(58) Field of Search ........................ 310/67 R, 156.16, 310/85, 156.21–156.22, 156.26, 156.05–156.08, 156.01, 156.75, 66, 74, 156.74, 156.76, 156.77; 360/99.08

(56) References Cited

U.S. PATENT DOCUMENTS

| | | | |
|---|---|---|---|
| 4,099,104 A | 7/1978 | Muller | 318/138 |
| 4,631,431 A | 12/1986 | Viskochil | 310/13 |
| 4,924,125 A * | 5/1990 | Clark | 310/67 R |
| 5,006,943 A * | 4/1991 | Elsasser et al. | 360/99.08 |
| 5,157,296 A | 10/1992 | Stefansky et al. | 310/67 R |
| 5,334,896 A | 8/1994 | Ohsawa | 310/90 |
| 5,659,216 A * | 8/1997 | Bisantz | 310/156.26 |
| 5,875,069 A | 2/1999 | Suzuki et al. | 360/99.04 |
| 5,880,545 A * | 3/1999 | Takemura et al. | 360/99.08 |
| 6,018,438 A * | 1/2000 | Nottingham et al. | 360/98.07 |
| 6,023,839 A * | 2/2000 | Kinoshita et al. | 29/598 |
| 6,055,126 A * | 4/2000 | Kennedy et al. | |
| 6,137,199 A * | 10/2000 | Lindsley | 310/74 |
| 6,339,515 B2 * | 1/2002 | Lee et al. | 360/99.08 |
| 6,373,655 B1 * | 4/2002 | MacLeod et al. | 360/99.08 |
| 6,627,932 B1 * | 9/2003 | Drewes | 257/295 |
| 6,809,898 B1 * | 10/2004 | Prochazka | 360/99.08 |

FOREIGN PATENT DOCUMENTS

| | | | | |
|---|---|---|---|---|
| JP | 04103076 A | * | 4/1992 | G11B/19/20 |
| JP | 11018384 A | * | 1/1999 | H02K/21/22 |

* cited by examiner

*Primary Examiner*—Darren Schuberg
*Assistant Examiner*—J. Aguirrechea
(74) *Attorney, Agent, or Firm*—Morrison & Foerster LLP

(57) ABSTRACT

A magnetic flux shield extending substantially the entire width of a magnetic disk drive spindle motor magnet is mounted between the magnet and the disk drive's base frame and rotates with the magnet. The flux shield is formed of a magnetic material to capture any stray magnetic flux from the motor magnet that may produce power draining eddy currents in the base frame.

18 Claims, 3 Drawing Sheets

FIG._1

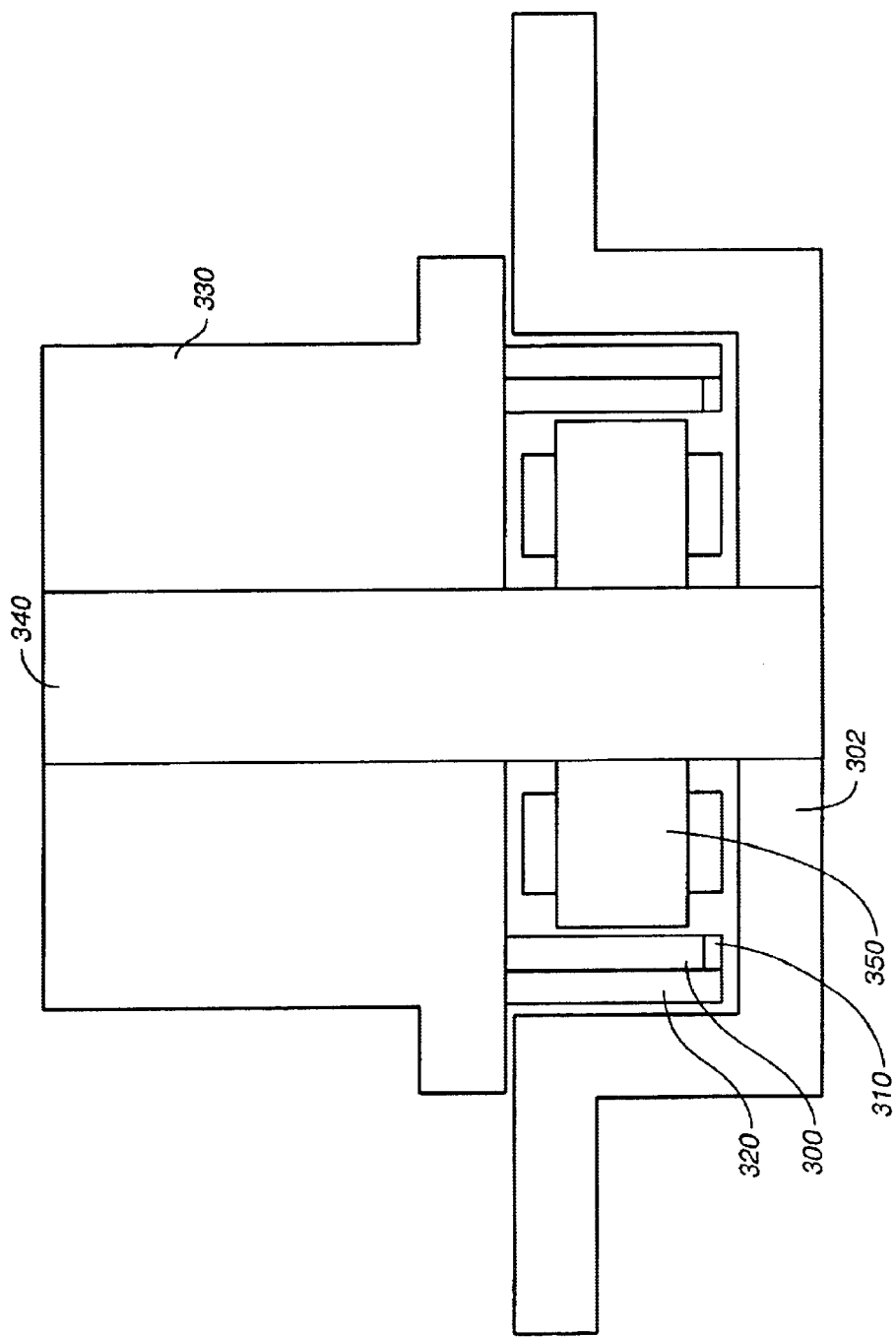
FIG._3

APPARATUS FOR REDUCING SPINDLE MOTOR MAGNETIC DRAG

CROSS-REFERENCE TO RELATED APPLICATIONS

This application claims priority benefit of U.S. provisional patent application Ser. No. 60/255,264, filed Dec. 13, 2000, entitled METHOD OF REDUCING SPINDLE MOTOR MAGNETIC LOSSES in the name of Ralph James Knotts and Garry Edward Korbel, which is herein incorporated by reference in its entirety.

THE INVENTION

The invention relates to the field of high speed spindle motor design, and more specifically to optimized spindle motor design to maintain constant high speed rotation with minimum power losses.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle or hub. The information is accessed by means of read/write heads generally located on a pivoting arm that moves radially over the surface of the disc. The read/write heads or transducers must be accurately aligned with the storage tracks on the disc to ensure proper reading and writing of information, and the discs must be rotated at a constant known speed.

During operation, the discs are rotated at very high speeds within an enclosed housing by means of an electric motor that drives a hub which supports the discs for rotation. Such motors, which are commonly referred to as spindle motors, have a spindle or sleeve mounted by means of two ball bearing or one or more hydrodynamic bearing systems to a motor shaft disposed in the center of the hub. Generally, such motors include a stator comprising a plurality of teeth arranged in a circle. Each of the teeth support a plurality of coils or windings that may be sequentially energized to polarize the stator. A plurality of permanent magnets are disposed in alternating polarity adjacent the stators. As the coils disposed on the stators are sequentially energized in alternating polarity, the magnetic attraction and repulsion of each stator to the adjacent magnets causes the spindle or hub to rotate, thereby rotating the disc and passing the information storage tracks underneath the head. This arrangement of stator teeth or laminations, coils and magnets may be mounted either inside the hub or spindle, or lower on the shaft below the hub or spindle in order to make the cross-sectional area occupied by the spindle or rotating sleeve as small as possible.

Currently, disk drive spindle motors are being operated at increasingly higher speeds in order to speed up access times and increase storage capacities. In current spindle motor design, the problem arises from the fact that the magnet, as described above, has a plurality of poles. The inventors have recognized that when a magnet with a plurality of poles is moving at high speed near a piece of metal, then the stray flux emitted by the magnet may interact with that metal and create a drag on the rotating magnet. The faster the speed of the rotation of the magnet past the metal, (such as is found in the flange or base of the housing of a disc drive), the more drag is created. This can create a serious power loss in the disc drive system. Thus the problem presented is to prevent undue distribution of stray magnetic flux and reduce the undesirable power losses. At higher speeds the system power increases due to windage loading, bearing losses, magnetic coupling, etc. It is highly desirable that power dissipation be prevented from increasing as drive performance is incremented. With this requirement, this patent seeks to reduce system losses due to magnetic fringing from the spindle motor magnet. Two components of magnet losses are being addressed here, one is Magnetic Hysteresis and is directly related to magnetic angular velocity. Power hyst=d phi d T and is=2*pi*RPM/60*number of magnetic poles.

Another more significant loss factor is eddy current losses which is an exponential function. Power eddy=(2*pi*RPM/60*number of poles)^2.

SUMMARY OF THE INVENTION

An objective of the present invention is to optimize spindle motor design so that even at very high speeds, power losses are reduced.

The main objective of the invention is to provide means for capturing stray magnetic flux and keeping it from interacting with surrounding metal of the motor frame, in order to prevent unnecessary drag being imposed on the rotation of the magnet and hub.

This patent eliminates the changing field in a surface by providing a co-rotating magnetic shunt with the permanent magnet. Because the shunt rotates with the magnet the magnetic angular velocity in the shunt is zero and the power losses are also zero.

These and other objectives of the present invention are achieved in a motor comprising a shaft supported from a base frame and supporting a hub and one or more on the outer diameter thereof. A stator is supported from the shaft, and comprises a plurality of laminations supporting coils which are sequentially energized to cause rotation of a hub which overlies the stator and supports a magnet and back iron radially adjacent these stator coils. According to this invention, a shield is provided extending substantially the entire width of the magnet and intervening between the magnet and the base frame and rotating with the magnet. The flux shield is formed of a magnetic material to capture any stray magnetic flux from the motor magnet. The flux shield is preferably formed of steel or mu metal to effectively shield the magnetic pole transitions of the multi-pole magnet from the underlying metallic base.

BRIEF DESCRIPTION OF THE DRAWINGS

So that the manner in which the advantages of the invention are attained can be understood, a description of invention can be had by reference to the embodiments thereof which are illustrated in the following drawings.

It is to be noted, however, that the appended drawings illustrate only exemplary embodiments of this invention and are not to be considered limiting of its scope, for the invention may admit to other equally effective embodiments.

FIG. 3 is schematic vertical sectional view of the modified motor design presented in accordance with the present invention.

DETAILED DESCRIPTION OF THE PREFERRED EMBODIMENTS

Figure 1:
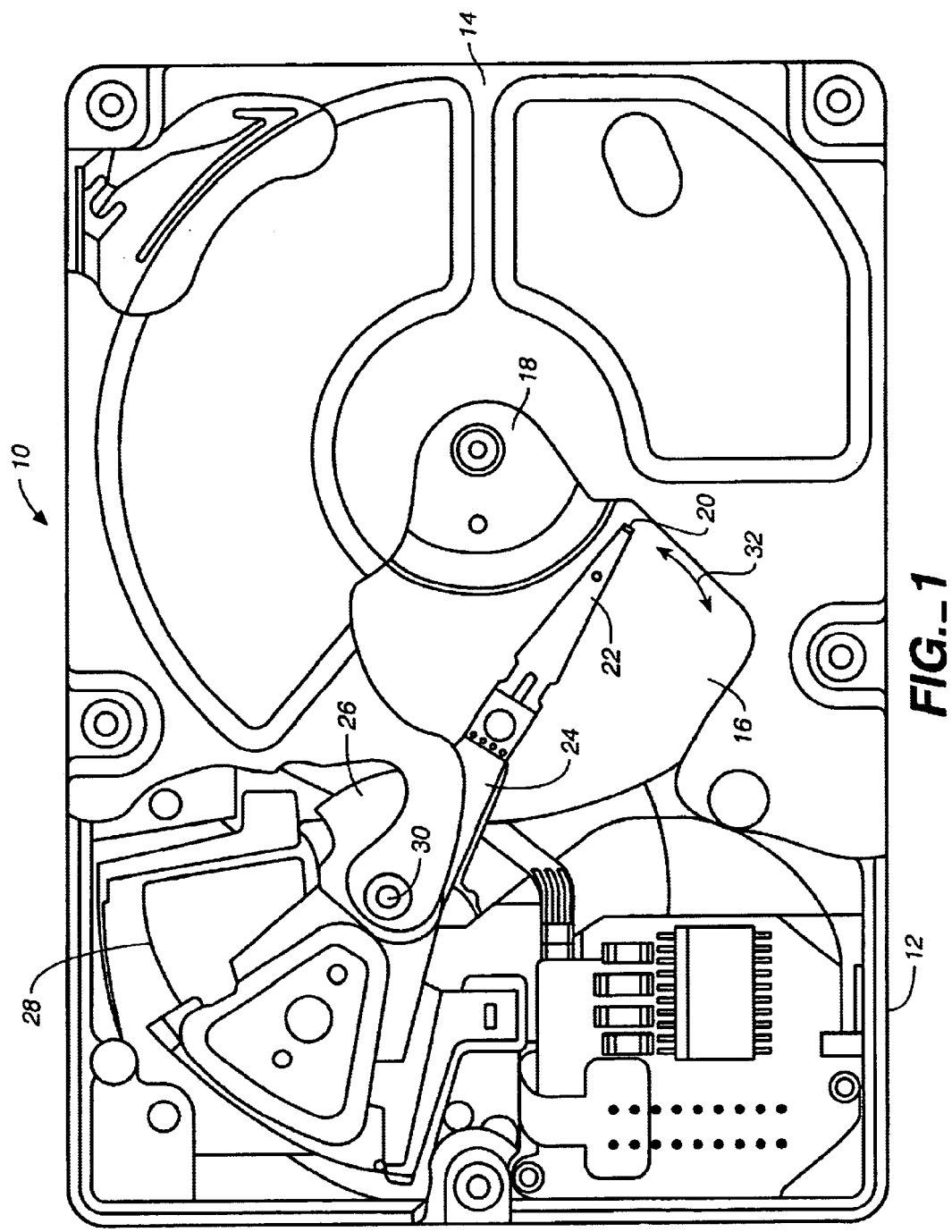
FIG. 1 is a top plan view of a disc drive data storage device in accordance with the invention.

The invention is especially useful in a spindle motor for a disc drive data storage device because of the need for a reliable low power loss motor. Of course the invention is also useful in other high speed environments. FIG. 1 is a plan view of a typical disc drive 10 wherein the invention is useful. Disc drive 10 includes a housing base 12 and a top cover 14. The housing base 12 is combined with top cover 14 to form a sealed environment to protect the internal components from contamination by elements from outside the sealed environment.

The base and top cover arrangement shown in FIG. 1 is common in the industry. However, other arrangements of the housing components have been frequently used, and the invention is not limited to the configuration of the disc drive housing.

Disc drive 10 further includes a disc pack 16 that is mounted for rotation on a spindle motor (not shown) by a disc clamp 18. Disc pack 16 includes one or more individual discs that are mounted for co-rotation about a central axis. Each disc surface has an associated head 20 that is mounted to disc drive 10 for communicating with the disc surface. In the example shown in FIG. 1, heads 20 are supported by flexures 22 that are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 32. While a rotary actuator is shown in FIG. 1, the invention is also useful in disc drives having other types of actuators, such as linear actuators.

Figure 2:
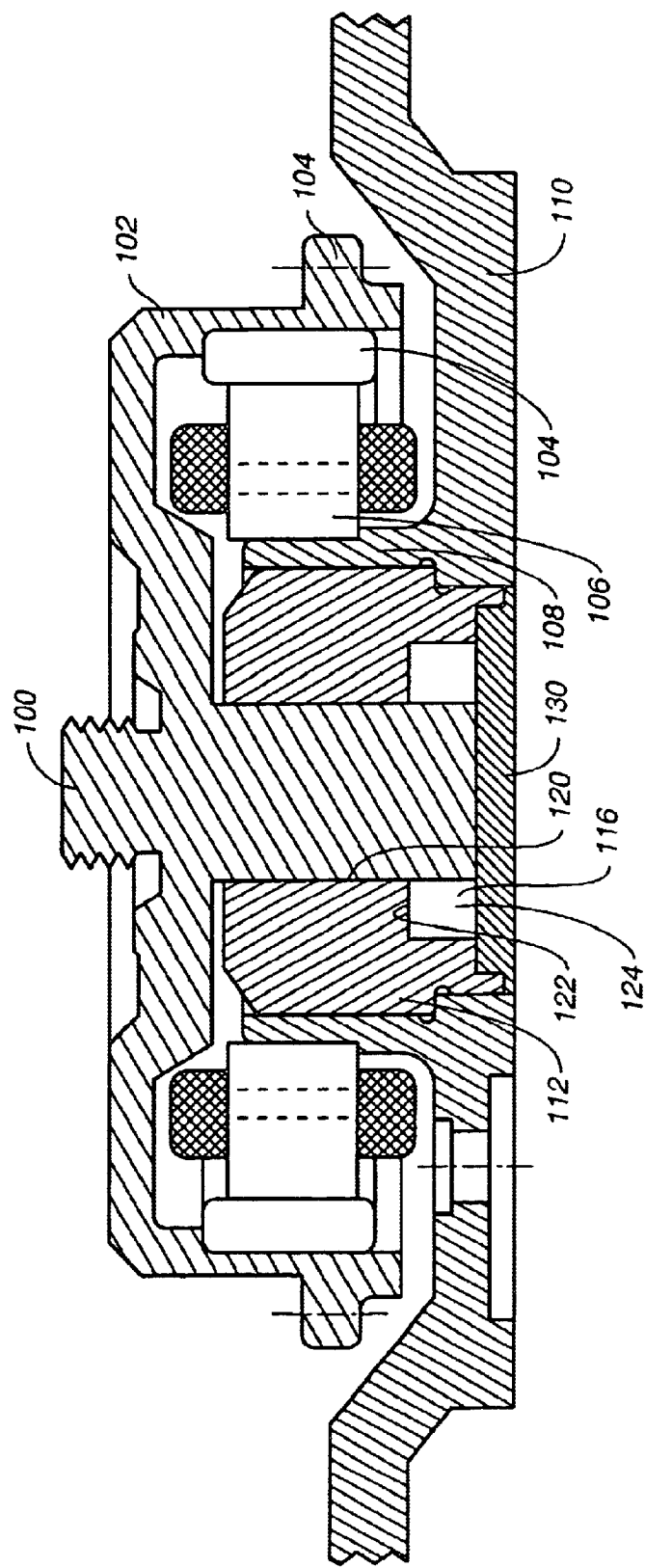
FIG. 2 is a vertical sectional view of a typical disk drive spindle motor in which the present invention is useful.

FIG. 2 shows a rotating shaft 100 spindle motor design of a type which could be used in the disc drive of FIG. 1. The rotating shaft is integrated with the hub 102 which carries flange 104 which functions as a disc support surface. The shaft with the hub 102 supports a magnet 104 on its inner axial surface, facing stator 106 whose energization causes stable rotation of the hub. The stator in turn is supported on an axial extension 108 of base casting 110. A sleeve 112 which supports the shaft 100 and its associated thrust plate 116 is incorporated into the axial extension 108 of the base 110. This sleeve 112 has axial surface 120 that faces a surface of the shaft. These two surfaces define a journal bearing which is of standard design and not further shown. Further, the thrust plate at surfaces 122 and 124 define in cooperation with the sleeve 112 and the counterplate 130 thrust bearings of the fluid dynamic type which further support the shaft against both axial and radial forces. Each of these journal and thrust bearings utilizes fluid in the gap between the facing surfaces to support rotation. The present invention may be used in either such rotating shaft motors, or in the fixed shaft design shown in FIG. 3. It is believed the design will be especially useful in motors such as FIG. 3 using what is termed an "under-hub" design where the motor is located in a well, defined by the base, under the rotating hub.

It is well known, as described above in the back ground of the invention, that the magnets in use in such spindle motor comprise multiple poles. It is apparent from an inspection of vertical sectional view of FIG. 2 as well as the vertical section of FIG. 3, that the magnet 300 is rotating relatively close to the support flange 302 of the disc drive housing well. It has been found by the inventors that when a multi pole magnet moves over a closely adjacent metal magnetic surface, that with the quick passage of the magnetic pole transitions over the surface, the stray magnetic flux induces a reverse magnetic field in the metal 302 over which the magnet 300 is passing. This reverse magnetic field causes a drag on the rotation of the motor. This drag effect becomes especially significant at the high speeds of the rotation which are currently being achieved or are planned for future spindle motors in disc drives. The effect is also more pronounced as the axial clearance between magnet and housing or flange is reduced. Therefore, in order to prevent this drag from being induced, according to the present invention, a shield 310 is added to the base of the magnet 300. Typically this shield is supported from or even integrated with the back iron 320 which supports the magnet 310 for rotation and rotates with the magnet. Both the back iron 320 magnet 300 and shield 310 are supported from the rotor 330 and rotate with the rotor around the shaft 340, under the control of the currents applied to the stator core 350. With the shield in place, it has been found that the drag, caused by the induced reverse magnetic field in the magnetic base or flange 302 of the housing, is substantially diminished or even eliminated.

As noted above, the flange shield may extend either partly or entirely across the axial end of the magnet, and may be fastened directly to the axial end of the magnet although it may be spaced there from. In either arrangement, the method for attachment should permit the flange shield to perform its function of capturing stray magnetic fields from the magnet. It should be formed of the same or similar metal to that used in the back iron, typically steel or mu metal.

Other variation of the invention may become apparent to a person of skill in the art who studies the invention disclosure. Therefore, the scope of the invention is to be limited only by the following claims.

What is claimed is:

1. A spindle motor comprising a shaft supported from a base frame and supporting on the outer diameter thereof a stator comprising a plurality of laminations supporting coils which are sequentially energized to cause rotation of a hub supporting one or more discs for rotation in a plane axially over the stator, the hub supporting a magnet affixed to a back iron disposed radially adjacent the stator coils, the back iron further supporting a flux shield extending substantially across the entire width of the magnet and intervening between the motor magnet and the base, the flux shield being formed of a magnetic material for capturing stray magnetic flux from the motor magnet.

2. A motor as claimed in claim 1 wherein the shield is comprised of steel.

3. A motor as claimed in claim 1 wherein the shield is comprised of mu metal.

4. A motor as claimed in claim 1 wherein the shield is integrated with the back iron.

5. A motor as claimed in claim 1 wherein the shield is glued to the axial end of the magnet facing the base.

6. A shield as claimed in claim 1 wherein the shield extends the entire width of the magnet but is limited to extending the radial width of the magnet.

7. A motor as claimed in claim 1 therein the base defines a well, the magnet and back iron extending axially from a lower surface of the rotor and being axially below the discs so that the stator and magnet and back iron of the motor are all axially located below the hub and the discs supported by the hub.

8. A motor as claimed in claim 1 wherein the flux shield is spaced from the magnet.

9. A spindle motor for a disc drive comprising a shaft supported from a base and supporting on the outer diameter thereof a stator comprising a plurality of laminations supporting coils which are sequentially energized to cause rotation of a hub supporting one or more discs for rotation in a plane axially over the stator, the hub supporting a motor magnet affixed to a back iron disposed radially adjacent to the stator coils, and means for capturing stray magnetic flux from the motor magnet, said means being supported from the back iron and being formed of a magnetic material.

10. The motor as claimed in claim 9 wherein the means for capturing stray magnetic flux from the motor magnet is spaced from the magnet.

11. A spindle motor comprising a shaft supported from a base and supporting on the outer diameter thereof a stator comprising a plurality of laminations supporting coils which are sequentially energized to cause rotation of a hub supporting one or more discs for rotation in a plane axially over the stator, the hub supporting a motor magnet affixed to a back iron disposed radially adjacent to the stator coils and rotating over the base, the back iron further supporting a flux shield extending substantially across the entire width of the motor magnet and intervening between the motor magnet and the base and rotating with the motor magnet, the flux shield being formed of a magnetic material for capturing stray magnetic flux from the motor magnet.

12. A motor as claimed in claim 11 wherein the shield is comprised of steel.

13. A motor as claimed in claim 11 wherein the shield is comprised of mu metal.

14. A motor as claimed in claim 11 wherein the shield is integrated with the back iron.

15. A motor as claimed in claim 14 wherein the shield extends the entire width of the magnet but is limited to extending the radal width of the magnet.

16. A motor as claimed in claim 15 wherein the shield is comprised of steel.

17. A motor as claimed in claim 11 wherein the shield is glued to the axial end of the magnet facing the base.

18. The motor as claimed in claim 11 wherein the flux shield is spaced from the magnet.

* * * * *